United States Patent [19]

Grenier

[11] 4,403,001

[45] Sep. 6, 1983

[54] ELECTROLESS APPLICATION OF A SILVER COATING TO DIAMOND PARTICLES

[75] Inventor: John W. Grenier, Bad-Soden, Fed. Rep. of Germany

[73] Assignee: General Electric Company, Worthington, Ohio

[21] Appl. No.: 264,733

[22] Filed: May 18, 1981

[51] Int. Cl.³ .............................................. B05D 7/00
[52] U.S. Cl. .................................... 427/217; 428/403; 51/309
[58] Field of Search ....................... 252/476; 427/217; 428/403

[56] References Cited

U.S. PATENT DOCUMENTS

| | | | |
|---|---|---|---|
| 2,424,083 | 7/1947 | Ferich | 252/476 |
| 2,424,085 | 7/1947 | Bergsteensson | 252/476 |
| 3,902,873 | 9/1975 | Hughes | 51/298 |
| 3,940,510 | 2/1976 | Hohne | 427/217 |
| 3,983,266 | 9/1976 | Bahls | 427/164 |
| 4,102,702 | 7/1978 | Bahls | 106/1.23 |
| 4,240,830 | 12/1980 | Lee | 427/217 |

FOREIGN PATENT DOCUMENTS

| | | |
|---|---|---|
| 1492567 | 7/1969 | France. |
| 1522735 | 3/1976 | France. |
| 54-21926 | 2/1979 | Japan .................................... 427/217 |
| 1095564 | 12/1967 | United Kingdom. |
| 1154598 | 6/1969 | United Kingdom. |
| 1473218 | 5/1977 | United Kingdom. |

*Primary Examiner*—Sam Silverberg
*Attorney, Agent, or Firm*—Douglas B. Little; Robert R. Schroeder

[57] ABSTRACT

Disclosed is an improved method for applying a coating of elemental silver on the exterior surfaces of diamond particles wherein an ammoniacal silver solution is mixed with the reducing solution and the diamond particles contacted with said mixture. The improvement of the present invention comprises agitating the ammoniacal silver solution containing said diamond particles sufficiently to suspend the particles therein and adding the reducing solution to the agitated ammoniacal solution at a metered rate adequate to produce a continuous grainy elemental silver coating on the diamond particles. A typical reducing solution is aqueous invert sugar.

2 Claims, 4 Drawing Figures

ELECTROLESS APPLICATION OF A SILVER COATING TO DIAMOND PARTICLES

CROSS-REFERENCE TO RELATED APPLICATIONS

This application is cross-referenced to the commonly assigned application of William W. Ruark and Edwin A. Pascoe entitled "DRY GRINDING CEMENTED CARBIDE WORKPIECES WITH SILVER-COATED DIAMOND GRIT", U.S. Ser. No. 264,765, filed on even date herewith, the disclosure of which is expressly incorporated herein by reference.

BACKGROUND OF THE INVENTION

The present invention relates to electroless silver coating of materials and more particularly to the electroless silver coating of diamond grit.

Use of metal coated diamond grit embedded in the abrasive section of resin bonded grinding elements is a well practiced commercial technique for enhancing the grinding operation. A wide variety of metals for coating the diamond grit have been proposed in the art. The following citations propose diamond grit having a coating of silver thereon: U.S. Pat. Nos. 2,411,867; 3,779,727; 3,957,461; 3,528,788; and 3,955,324; British Pat. No. 1,344,237; and German Pat. No. 2,218,932. Note that U.S. Pat. Nos. 4,024,675 and 4,246,006 form aggregates of diamond grit in a metal matrix which includes silver and U.S. Pat. No. 4,239,502 dips diamond or cubic boron nitride in a molten silver/manganese/zirconium brazing alloy.

The foregoing art, which to some degree proposes to provide a silver coated diamond grit, proposes among other techniques a conventional electroless coating technique whether the metal being coated is silver or another metal. The electroless coating or chemical reduction coating technique typically involves the formation of an ammoniacal silver solution which contains a reducing agent. The diamond grit to be coated is added to such solution for the silver to be deposited from the solution onto the surfaces of the diamond grit.

Typical conventional silver coating formulations can be found in U.S. Pat. No. 3,915,718, and in the article "Electroless Deposition of Silver Using Dimethylamine Borane", *Plating*, February, 1974, and "The Making of Mirrors by the Deposition of Metal on Glass", U.S. Department of Commerce, Bureau of Standards, Circular of the Bureau of Standards, No. 389, issued Jan. 6, 1931. While conventional techniques appear to succeed rather well when applying a coating of silver to glass, metal, or other objects, such techniques do not provide acceptable coatings on diamond grit. In particular, coatings deposited from such conventional formulations, such as the Brashear formula set forth in the Bureau of Standards circular, are of a spongy filamentary character which tends to be spotty on the surface of the grit. Moreover, only a small percentage of the available silver is deposited on the surface of the diamond grit. Thus, there is a need in the art for a simple technique for the electroless coating of diamond grit with silver wherein a substantially uniform, continuous, coherent coating of silver coats the diamond grit.

BROAD STATEMENT OF THE INVENTION

The present invention is an improved method for applying a coating of elemental silver on the exterior surfaces of diamond particles wherein an ammoniacal silver solution is mixed with a reducing solution and the diamond particles contacted with said mixture. The improvement comprises agitating the ammoniacal solution containing said diamond particles sufficiently to suspend the particles therein and adding the reducing solution to the agitated ammoniacal solution at a metered rate adequate to produce a continuous, grainy elemental silver coating on the diamond particles. The reducing solution preferably is aqueous invert sugar. In conventional silvering processes such as the Brashear process, for example, the silver nitrate solution and the reducing solution are admixed just prior to applying such mixture to the surface of the object to be silver coated.

Advantages of the present invention include the production of a grainy coating on the diamond grit which is coherent and uniform in thickness. Another advantage is the effective use of silver from the solution. A further advantage is better adhesion of the silver coating to the diamond particle and a higher percentage of the precipitating silver being deposited on the diamond grit. These and other advantages will be readily apparent to those skilled in the art based on the disclosure contained herein.

DETAILED DESCRIPTION OF THE DRAWINGS

Figure 1A:
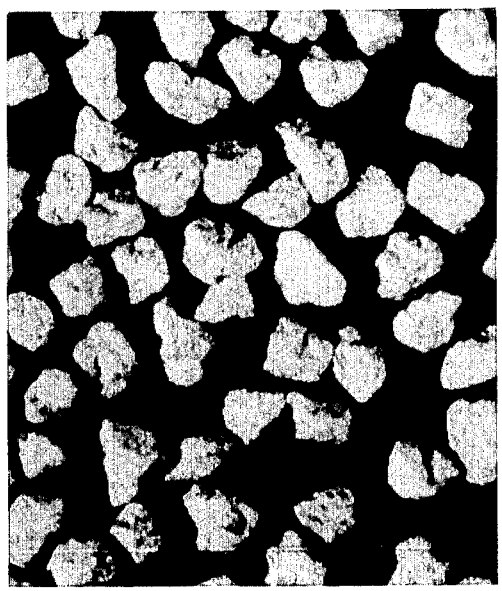
FIGS. 1A and 1B are photomicrographs (magnified 75x and 600x, respectively) of diamond grit (140/170 mesh or 106/90 microns) coated with a coating of silver according to the process of the present invention.

All of the diamond grit coated in the drawings initially was activated by treatment with an aqueous solution of stannous chloride and HCl. The activated grit then was rinsed with deionized water and divided into two lots. One lot, shown in FIGS. 1A and 1B, was coated according to the process of the present invention using the ammoniacal silver solution and the reducing solution given in the formulation for coating a 50 gram batch of grit, detailed later herein. Three repeats of such process were conducted. The diamond grit prepared by the Brashear process, FIGS. 2A and 2B, was prepared according to the procedure shown in the Bureau of Standards circular except that the diamond grit was stirred. Again, three repeats of the Brashear process were conducted.

Figure 1B:
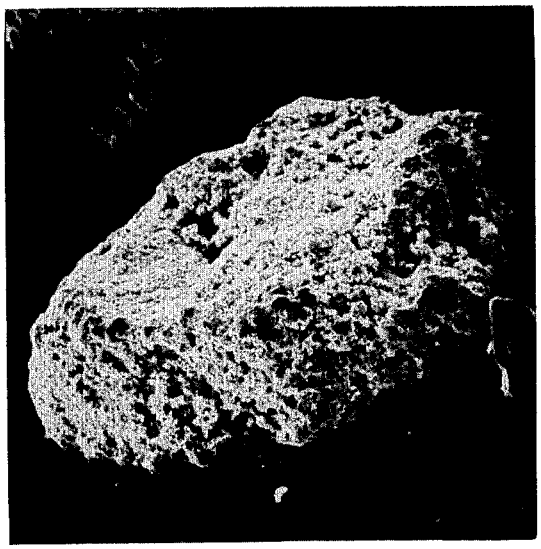
Figure 2A:
FIGS. 2A and 2B are photomicrographs (magnified 75x and 600x, respectively) of the same size diamond grit coated with a silver coating according to the Brashear process disclosed in the Bureau of Standards circular cited above.
Figure 2B:
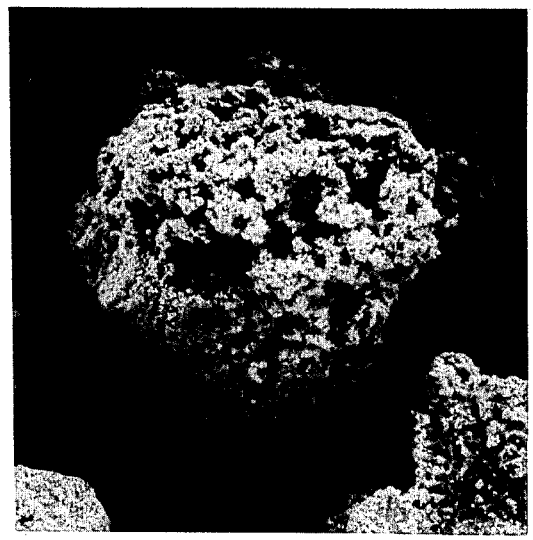

Note the spongy appearance of the silver coating in FIG. 2B compared to the grainy coating seen in FIG. 1B of the grit prepared by the process of the present invention. Also, note in FIG. 2A that nodules of silver can be seen attached to the diamond grit. Such silver nodules on the silver coated grit are not apparent in FIG. 1A. The coating of the grit in 1B, prepared according to the process of the present invention, also appears to be uniform in thickness, whereas the silver coating on the comparative grit in FIG. 2B is not as uniform in thickness.

DETAILED DESCRIPTION OF THE INVENTION

As briefly noted above, the essence of the process of the present invention involves the slow metered addition of the reducing solution to the ammoniacal silver solution containing the diamond grit suspended therein. The slow deposition of silver resulting thereby yields unexpected properties of the silver coating. Initially, the coating is noted to be grainy rather than spongy. This can be seen in the figures. Additionally, the coating was determined to completely cover the diamond crystals and is uniform in thickness. Also, the elemental silver coating appears to be better adhered to the diamond particle by the improved process of the present invention as well as a higher percentage of the precipitating silver from the solution deposits on the diamond particles. The process of the present invention yields up to 75% and more of the available silver in the solution as a coating on the diamond grit. This percentage is a substantial improvement over, for example the Brashear formula, which converts only about 15–20% of the available silver to a coating.

Diamond grit to be coated by the process of the present invention will have its surfaces cleaned of residual graphite, lubricating oils, and other impurities found on the surfaces of the diamond grit. While use of detergents, chromic acid, and other harsh cleaning formulations may be required on occasion for very contaminated or dirty diamond, typically cleaning with aqua regia or other acid will suffice.

Next, the surfaces of the diamond particles are activated in conventional fashion by contacting the diamond grit with stannous chloride and HCl or other acid in water. Typically, 50 g of diamonds is stirred for about 20 minutes in one liter of a hot (eg. 60° C.) aqueous solution containing 20 g/l of stannous chloride and 20 g/l of HCl (15-16 molar). The activated grit then may be rinsed with deionized water. The activated diamond particles now are ready for coating by the process of the present invention.

A preferred formulation for coating diamond grit with a silver coating and a typical formulation for coating a 50 gram batch of grit are given below.

| Ingredient | Preferred Concentration | Proportion for 50 g of grit |
| --- | --- | --- |
| AMMONIACAL SILVER SOLUTION | | |
| $AgNO_3$ (specific gravity of 1.42) | 0.3 g-moles/l | 20 g |
| KOH | 0.3 g-moles/l | 10 g |
| $NH_4OH$ (specific gravity of 0.90) | 0.66 g-moles/l | 50 ml |
| $H_2O$ | — | 400 ml |
| REDUCING SOLUTION | | |
| Sugar (Sucrose) | 0.26 g-moles/l | 90 g |
| $HNO_3$ | 4 ml/90 g sugar | 4 ml |
| $H_2O$ | — | 1 l |

The reducing solution is made by adding the table sugar to the deionized water followed by the further addition of the nitric acid. This solution is boiled (heated at about 90° C.) for about one-half hour to dissolve the sugar and convert it to its invert form. The solution then is cooled to about room temperature. Th ammoniacal silver solution is made by the addition of the silver nitrate to 300 mls. of deionized water to which is added the potassium hydroxide dispersed in the remaining water. This solution will turn a murky brown. The ammonium hydroxide is added to the solution and the solution stirred until its color returns to clear.

The process itself typically operates with the reducing and ammoniacal silver solutions at room temperature through lower temperatures of the solutions can be used as is necessary, desirable, or convenient. Increased temperatures of the solutions are not recommended as increased temperatures would tend to increase the rate of deposition of silver which is not desired. The diamond grit is added to th ammoniacal silver solution described above and the solution agitated with a mechanical stirrer, compressed air, or by other conventional technique at a rate sufficient so that the diamond grit is suspended in the solution, i.e. the grit is not lying on the bottom of the vessel.

The next step involves the retarded metered addition of the reducing solution to the agitated ammoniacal silver solution containing suspended diamond grit. Using the formulation noted above, an advantageous rate of addition is about 25 drops per minute of the reducing solution to the ammoniacal silver solution, though such rate of addition can range from about 20 to 125 drops/minute. The metered addition of the reducing agent provides a slow deposition of silver onto the surfaces of the diamond grit to produce the unique elemental silver coating of the present invention on the diamond grit. When the reducing solution all has been added to the ammoniacal silver solution, the stirring is discontinued and the diamond grit is separated from the liquid solution by decantation or similar technique. The diamond is rinsed with additional water and dried. The rinse water as well as the spent silvering solution then can be subjected to a recovery operation for recovery of any remaining silver therein. An exemplary recovery operation involves the addition of HCl or $HNO_3$ to the solution to bring the pH to about 6. This solution then is filtered for recovery of silver chloride when the acid is HCl or subjected to conventional recovery of the colloidal silver nitrate when nitric acid is used.

The diamond grit is subjected to the foregoing operation a repeated number of times in order to provide a predetermined weight proportion of the silver coating on the diamond. For example, when coating 80/100 mesh diamond at a coating weight of 50%, nine repeats of the foregoing procedure have been required. For other sized diamond particles and for various coating percentages, differing numbers of repeats (typically ranging from 6 to 12 repeats) of the coating process will be required. The number of coating steps required will be readily determined by those skilled in the art.

Other conventional reducing agents useful in the process of the present invention include aqueous sodium hypophosphite and aqueous formaldehyde in concentrations not exceeding 0.1 molar for each reducing solution. The sodium hypophosphite solution additionally should be basic (preferably having a pH about the same as the ammoniacal silver solution). These alternative reducing solutions could be used in the same manner as the aqueous invert sugar solution is used, eg. as described above for the 50 g diamond batch, except that the rate of addition of these alternative reducing solutions to the ammoniacal silver solution should be between 10 to 50 drops per minute.

The resulting silver coated diamond grit has been determined to be ideally suited for use in conventional resin bond grinding elements especially for the dry grinding of cemented carbide substrates. Further details on this use of the silver coated diamond grit of the present invention can be found in commonly assigned application of Ruark and Pascoe, U.S. Ser. No. 264,765, filed on even date herewith.

I claim:

1. In a method for applying a coating of elemental silver on the exterior surfaces of diamond particles wherein an aqueous ammoniacal silver solution is mixed with an aqueous reducing solution and said diamond particles contacted with said mixture, the improvement comprising:

(a) using an ammoniacal silver solution and a reducing solution which are formulated from the following ingredients:

| Ingredient | Concentration |
| --- | --- |
| AMMONIACAL SILVER SOLUTION | |
| $AgNO_3$ | 0.3 g-moles/l |
| KOH | 0.3 g-moles/l |
| $NH_4OH$ | 0.66 g-moles/l |
| INVERT SUGAR REDUCING SOLUTION | |
| Sugar | 0.26 g-moles/l |
| $HNO_3$ | 4 ml/90 g of sugar |

(b) agitating said ammoniacal solution containing said diamond particles sufficiently to suspend said particles therein; and (c) adding the reducing solution to said agitated ammoniacal silver solution at a metered rate adequate to produce a continuous, grainy elemental silver coating on said diamond particles, which for 50 g batches of said diamond particles is about 20 to 125 drops/min.

2. The method of claim 1 wherein for a 50 g batch of said diamond grit, said ammoniacal silver solution and said reducing solution are formulated from the following ingredients:

| Ingredient | Concentration |
| --- | --- |
| AMMONIACAL SILVER SOLUTION | |
| $AgNO_3$ | 20 g |
| KOH | 10 g |
| $NH_4OH$ | 50 ml |
| $H_2O$ | 400 ml |
| REDUCING SOLUTION | |
| Sugar | 90 g |
| $HNO_3$ | 4 ml |
| $H_2O$ | 1 l |

* * * * *